(No Model.)

J. M. & M. C. BOWERS.
BOLT.

No. 566,130.  Patented Aug. 18, 1896.

Witnesses
H. F. Hills.
K. A. Nau

Inventors
Jos. M. Bowers and
Moses C. Bowers
By John Wedderburn Attorney

UNITED STATES PATENT OFFICE.

JOSEPH M. BOWERS AND MOSES C. BOWERS, OF McKEESPORT, PENNSYLVANIA.

BOLT.

SPECIFICATION forming part of Letters Patent No. 566,130, dated August 18, 1896.

Application filed March 20, 1896. Serial No. 584,075. (No model.)

*To all whom it may concern:*

Be it known that we, JOSEPH M. BOWERS and MOSES C. BOWERS, citizens of the United States, residing at McKeesport, in the county of Allegheny and State of Pennsylvania, have invented certain new and useful Improvements in Bolts; and we do hereby declare the following to be a full, clear, and exact description of the invention, such as will enable others skilled in the art to which it appertains to make and use the same.

This invention relates to certain new and useful improvements in bolts and locks therefor; and it has for its object, among others, to provide a simple and cheap construction which embodies a threadless bolt as well as a threadless nut.

We form the bolt with a cam shape in cross-section and the nut with a corresponding shape, and may or may not employ a pin or key as an additional lock.

The device is applicable to many uses, such, for instance, as nut-locks for railroad purposes, wagons, machinery, and other places where it may be desired to use a nut-lock that is simple in its construction and easily applied.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1:
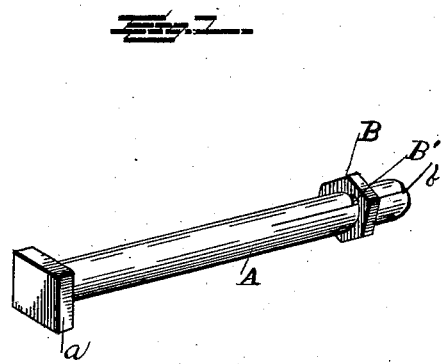
Figure 2:
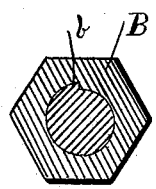
Figure 3:
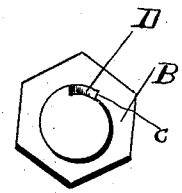

Figure 1 is a perspective view of our improved bolt and nut. Fig. 2 is a cross-section through the same. Fig. 3 is a view showing the locking-pin in position.

Like letters of reference indicate like parts throughout the several views.

Referring now to the details of the drawings by letter, A designates the bolt, which may be of any desired diameter and length and is shown as provided with a head $a$. The bolt is formed for a portion or the whole of its length of a cam or scroll shape, as seen in Fig. 2, the longitudinal shoulder $b$ thus formed being at substantially a right angle to the length of the bolt.

B is the nut. It is threadless and the bolt-opening B' thereof is of the same shape as that of the bolt is in cross-section, the shoulder $c$ thereof being lengthwise of the bolt-opening, as shown.

In practice the bolt is passed through the parts to be secured and then the nut is applied by placing it so that the bolt-opening will be coincident with the bolt, the shoulders of the bolt and nut engaging each other and the nut forced on the bolt as far as desired, and then by turning the nut to the right the cam action will serve to firmly bind the nut in position. The cam acting in both directions, but little movement of the nut is necessary in order to securely bind the parts in position.

When desired or necessary, we may employ a pin or key D, which is inserted into the space between the two shoulders after the nut has been turned as far as required to the right. This pin or key may be wedge-shaped, if desired.

The advantages of such a construction of bolt and nut will be readily appreciated by those having occasion to use such devices.

What is claimed as new is—

1. The combination with a bolt having a cross-section of cam shape, of a nut having a bolt-opening of corresponding shape, as set forth.

2. The combination with a threadless bolt with a longitudinal shoulder, of a threadless nut having a shoulder extending in the direction of the length of the bolt, and a pin adapted to be inserted in the space between the shoulders of the bolt and nut, substantially as specified.

In testimony whereof we have signed this specification in the presence of two subscribing witnesses.

JOS. M. BOWERS.
MOSES C. BOWERS.

Witnesses:
JNO. M. JAYCOX,
CHAS. S. ROSEN.